3,331,839
MIXED FUNCTIONAL ISOCYANURATES
Edwin D. Little, Hopewell, Va., assignor to Allied Chemical Corporation, New York, N.Y., a corporation of New York
No Drawing. Filed Sept. 30, 1965, Ser. No. 491,823
4 Claims. (Cl. 260—248)

This invention relates to novel isocyanurate compounds and to processes of preparing the same. More particularly it relates to 1-allyl and 1-hydroxyalkyl derivatives of 3,5-bis-(2-carbethoxyethyl)isocyanurates which may be represented graphically by the following general formula:

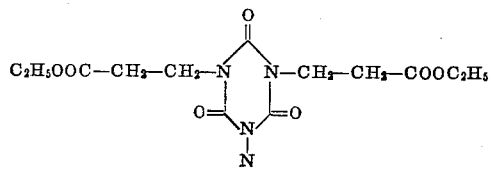

wherein R is a member selected from the group consisting of 2-hydroxyethyl, 2-hydroxypropyl and allyl radicals.

The hydroxyalkyl and allyl compounds are conveniently prepared by heating respectively (1) a mixture of 1,3-bis-(2-cyanoethyl)isocyanurate with an alkylene oxide having from 2 to 3 carbon atoms in an inert solvent such as N,N-dimethyl formamide, 1-methyl-2-pyrrolidone or the like at a temperature of about 100 to 155° C., preferably 120° C., for about 1 to 2 hours and esterifying the resulting intermediate or (2) a mixture of the sodium salt of 1,3-bis-(2-cyanoethyl)isocyanurate with allyl chloride, in the presence of cuprous chloride as catalyst at a temperature of about 45 to 60° C., preferably below 55° C., for about .75 to 1.3 hours while maintaining a pH of 10 to 11 and esterifying the resulting intermediate.

The 1,3-bis-(2-cyanoethyl)isocyanurate which is employed as a starting material in the preparation of the new compounds of the present invention may be prepared by reaction of acrylonitrile with cyanuric acid in accordance with the disclosure of U.S. application S.N. 814,671 filed May 21, 1959, now U.S. Patent No. 3,235,553.

The novel compounds of this invention are particularly suitable as precursors of polymers for use in coatings, adhesives and elastomers. Polyesters can readily be formed from isocyanurates having two carbethoxyethyl groups and the additional functional group imparts a highly important versatility to the polymers prepared therefrom, for example, they may be cross-linked or reacted with other polymers providing products of various degrees of plasticity and other modified properties.

The following examples illustrate the present invention. Parts are by weight and temperatures are given in degrees centigrade.

EXAMPLE 1

1-allyl-3,5-bis-(2-carbethoxyethyl)isocyanurate 32 parts of allyl chloride were added dropwise to an aqueous solution of 47 parts of the sodium salt of 1,3-bis-(2-cyanoethyl)isocyanurate in a stirred pot containing 0.2 part of cuprous chloride as catalyst. The reaction was run over a period of 0.75 hour at atmospheric pressure while maintaining the temperature at 48–54° and pH at 10–11. The insoluble 1-allyl-3,5-bis-(2-cyanoethyl) isocyanurate was recovered in 62% yield by filtration and recrystallization from water. It melted at 108–109°.

Elemental analysis.—Calculated for $C_{12}H_{13}N_5O_3$: C, 52.36; H, 4.76; N, 25.45. Found: C, 52.57; H, 4.73; N, 24.74.

27.6 parts of the bis-nitrile were esterified by bubbling HCl gas through a solution of 395 parts of ethanol containing an equimolar quantity of water (3.6 parts). After three hours at reflux temperature, the reaction mixture was filtered to remove ammonium chloride. 1-allyl-3,5-bis-(2-carbethoxyethyl)isocyanurate was recovered in 92% yield by pouring the filtrate onto ice water and extracting the aqueous solution with benzene. The material was an oil.

Elemental analysis.—Calculated for $C_{16}H_{23}N_3O_7$: C, 52.02; H, 6.28; N, 11.38. Found: C, 52.49; H, 6.41; N, 11.96.

EXAMPLE 2

1-(2-hydroxyethyl)-3,5-bis-(2-carbethoxyethyl) isocyanurate 20 parts of ethylene oxide were bubbled into a stirred solution of 47 parts of 1,3-bis-(2-cyanoethyl)isocyanurate in 472 parts of N,N-dimethylformamide containing 0.5 part of sodium hydroxide. The reaction required two hours. The temperature was maintained at 130–140°. 1-(2-hydroxyethyl)-3,5-bis-(2-cyanoethyl)isocyanurate was isolated in 98.5% yield by removing the solvent in vacuo and crystallizing the residue from hot ethanol solution. It melted at 118–119°.

Elemental analysis.—Calculated for $C_{11}H_{13}N_5O_4$: C, 47.31; H, 4.66; N, 25.08. Found: C, 47.37; H, 4.73; N, 24.70.

The bis-nitrile was esterified by the procedure employed in Example 1 and 1-(2-hydroxyethyl)-3,5-bis-(2-carbethoxyethyl)isocyanurate was obtained in 83% yield on removing the solvent. The product was an oil which did not crystallize.

Elemental analysis.—Calculated for $C_{15}H_{23}N_3O_8$: C, 48.25; H, 6.21; N, 11.25. Found: C, 47.88; H, 6.04; N, 11.34.

EXAMPLE 3

1-(2-hydroxypropyl)-3,5-bis-(2-carbethoxyethyl) isocyanurate 23.2 parts of propylene oxide were added dropwise to a solution of 47 parts of 1,3-bis-(2-cyanoethyl)isocyanurate in 472 parts of N,N-dimethylformamide containing 0.5 part sodium hydroxide. The reaction required one hour at 130–135°. 1-(2-hydroxypropyl)-3,5-bis-(2-cyanoethyl)isocyanurate was isolated in 84% yield by removing the solvent in vacuo and crystallizing the residue from ethanol. It melted at 132–133°.

Elemental analysis.—Calculated for $C_{12}H_{15}N_5O_4$: C, 49.14; H, 5.16; N, 23.88. Found: C, 49.17; H, 5.27; N, 23.23.

The bis-nitrile was esterified employing the procedure described in Example 1 and 1-(2-hydroxypropyl)-3,5-bis-(2-carbethoxyethyl)isocyanurate was obtained in 95% yield by removing the solvent. The material was a viscous, oily substance.

Elemental analysis.—Calculated for $C_{16}H_{25}N_3O_8$: C, 49.60; H, 6.50; N, 10.88. Found: C, 48.40; H, 6.48; N, 11.03.

I claim:
1. A compound of the formula:

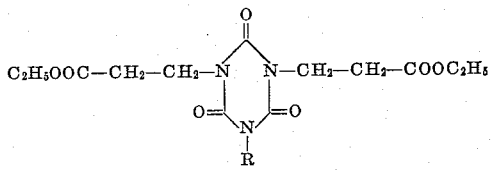

wherein R is a member selected from the group consisting of 2-hydroxyethyl, 2-hydroxypropyl and allyl radicals.
2. 1-allyl-3,5-bis-(2-carbethoxyethyl)isocyanurate.
3. 1 - (2-hydroxyethyl)-3,5-bis-(2-carbethoxyethyl)isocyanurate.
4. 1 - (2 - hydroxypropyl)-3,5-bis-(2-carboxyethyl)isocyanurate.

References Cited

UNITED STATES PATENTS

| | | | |
|---|---|---|---|
| 3,088,948 | 5/1963 | Little et al. | 260—248 |
| 3,132,142 | 5/1964 | Hopkins | 260—248 |
| 3,215,758 | 11/1965 | Hopkins | 260—248 |
| 3,231,577 | 1/1966 | Walles | 260—248 |
| 3,235,553 | 2/1966 | Sadle | 260—248 |

WALTER A. MODANCE, *Primary Examiner.*

JOHN M. FORD, *Assistant Examiner.*